United States Patent
Ghuge et al.

(10) Patent No.: US 10,073,747 B2
(45) Date of Patent: Sep. 11, 2018

(54) REDUCING RECOVERY TIME IN DISASTER RECOVERY/REPLICATION SETUP WITH MULTITIER BACKEND STORAGE

(71) Applicant: INTERNATIONAL BUSINESS MACHINES CORPORATION, Armonk, NY (US)

(72) Inventors: Deepak R. Ghuge, Sangamner (IN); Ashish Pandey, Pune (IN); Sandeep R. Patil, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/848,243

(22) Filed: Dec. 20, 2017

(65) Prior Publication Data

US 2018/0095840 A1  Apr. 5, 2018

Related U.S. Application Data

(63) Continuation of application No. 15/268,707, filed on Sep. 19, 2016.

(51) Int. Cl.
| | |
|---|---|
| G06F 11/00 | (2006.01) |
| G06F 11/14 | (2006.01) |
| G06F 3/06 | (2006.01) |

(52) U.S. Cl.
CPC .......... *G06F 11/1471* (2013.01); *G06F 3/065* (2013.01); *G06F 3/067* (2013.01); *G06F 3/0619* (2013.01); *G06F 2201/805* (2013.01); *G06F 2201/84* (2013.01)

(58) Field of Classification Search
CPC .................................................. G06F 11/1471
See application file for complete search history.

(56) References Cited

U.S. PATENT DOCUMENTS

| | | |
|---|---|---|
| 7,644,300 B1 | 1/2010 | Rao |
| 8,229,897 B2 | 7/2012 | Cannon et al. |
| 9,122,642 B2 | 9/2015 | Chavda et al. |
| 9,244,967 B2 | 1/2016 | Provenzano et al. |
| 9,563,683 B2 | 2/2017 | Abercrombie et al. |
| 9,594,514 B1 | 3/2017 | Bono et al. |

(Continued)

OTHER PUBLICATIONS

IBM: List of IBM Patents or Patent Applications Treated as Related (Appendix P), Jan. 9, 2018, pp. 1-2.

(Continued)

*Primary Examiner* — Bryce Bonzo
*Assistant Examiner* — Katherine Lin
(74) *Attorney, Agent, or Firm* — Samuel A. Waldbaum

(57) ABSTRACT

The first computer receives a signal that a second computer is back online after being offline, wherein the second computer was offline because of a failure. The first computer takes a first snapshot of the storage, wherein data that has a higher access frequency is stored on a first drive and data that has a lower access frequency is stored on a second drive. The first computer determines a snapshot difference between the first snapshot and a second snapshot. The first computer transmits the snapshot difference to the second computer, and transmits the data stored on the first drive to the second computer. The first computer promotes the data stored on the second drive to be considered equivalent to data stored drive and transmits the promoted data stored on the second drive to the second computer at the same transmission rate as the data stored on the first drive.

1 Claim, 6 Drawing Sheets

(56) References Cited

U.S. PATENT DOCUMENTS

| | | |
|---|---|---|
| 9,672,117 B1 | 6/2017 | Natanzon et al. |
| 2012/0117029 A1 | 5/2012 | Gold |
| 2016/0216909 A1 | 7/2016 | Provenzano et al. |
| 2017/0031772 A1 | 2/2017 | Subramanian et al. |

OTHER PUBLICATIONS

Mell et al., The NIST Definition of Cloud Computing, Recommendations of the National Institute of Standards and Technology Special Publication 800-145, Sep. 2011, 7 pages.

Pending U.S. Appl. No. 15/268,707, filed Sep. 19, 2016, entitled: "Reducing Recovery Time in Disaster Recovery/Replication Setup With Multitier Backend Storage", pp. 1-38.

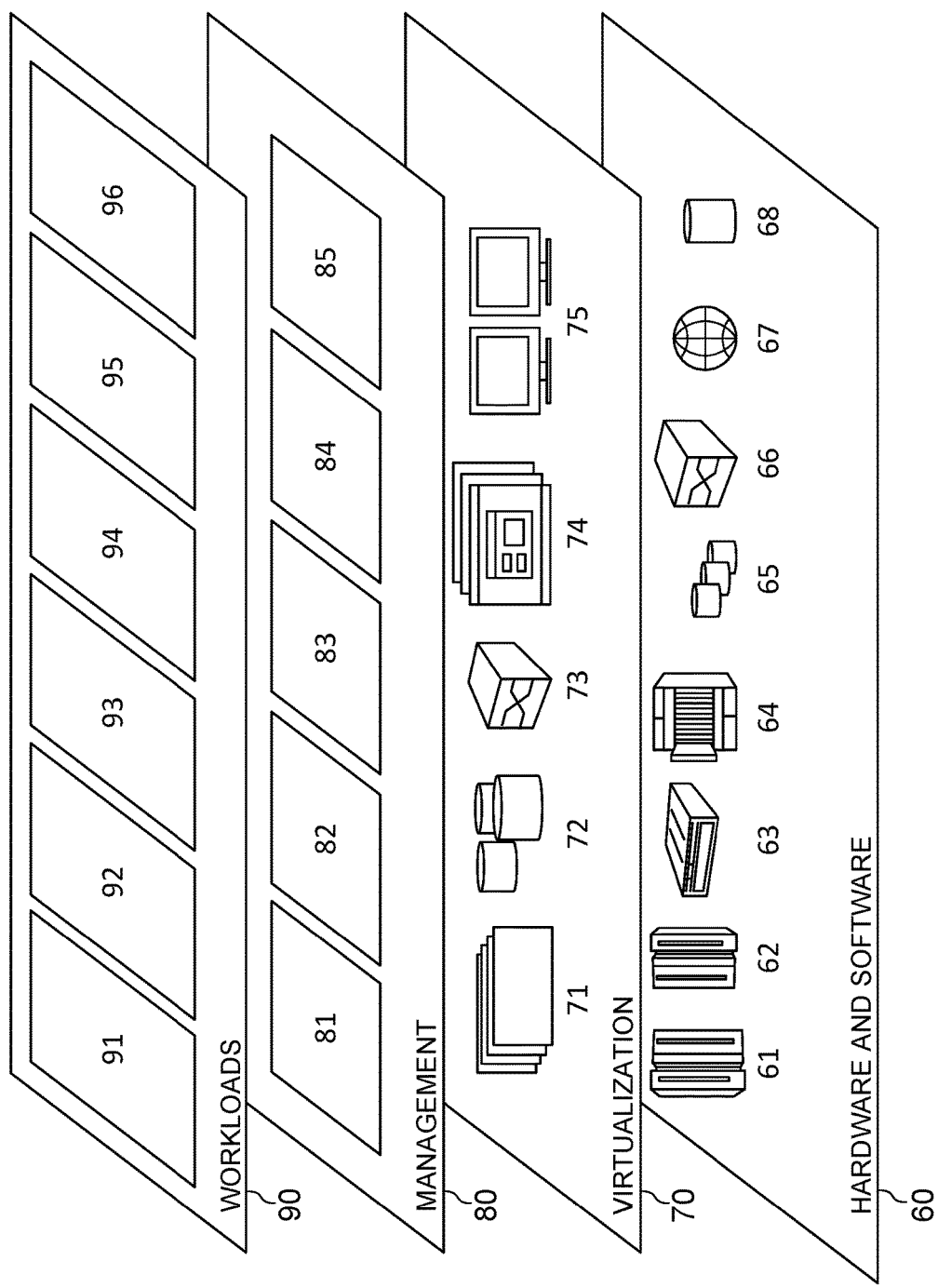

REDUCING RECOVERY TIME IN DISASTER RECOVERY/REPLICATION SETUP WITH MULTITIER BACKEND STORAGE

BACKGROUND

The present invention relates generally to the field of data disaster recovery, and more particularly to replicating data to a primary server when recovering data.

A relationship between a primary server and a secondary server is considered broken when there is a prolonged (and possibly permanent) failure of any component of the replication relationship. The following component failures will cause a termination of replication relationship: 1. When a prolonged network outage occurs, updates at the primary can no longer be pushed to the secondary in a timely fashion to satisfy Recovery Point Objective (RPO); 2. When the secondary server fails or is unreachable in other ways (besides link failure), the primary will detect the loss of connectivity similar to case; 3. When the primary site fails, this will be recognized by the applications and administrator. At this point, the relationship is automatically terminated, and a manual intervention is required.

Once a relationship is broken, reestablishing it depends on the type of failure experienced. Failover is when the secondary site fails and a new secondary must be setup. A new relationship needs to be setup between the existing primary and the new secondary and all the primary data populated at the new secondary. Failback is when the primary site fails, the secondary is upgraded to (Acting) Primary (read-write) and has updates. Once the old primary comes back, the relationship needs to be reestablished. This requires replaying the new updates at the secondary (Acting Primary) back at the primary site. On a network reconnect after outage or availability of secondary after a failure, changes made at the primary since the last synchronization occurred need to be replayed.

In a setup for disaster recovery where a primary server has failed and is back online or recovered after failure, snapshot data created on a secondary server (acting primary) in absence of an actual primary needs to be synced on an actual primary server. The time required for this movement of snapshot data can be significant because the transfer time depends on the tier on which data is currently present.

BRIEF SUMMARY

Additional aspects and/or advantages will be set forth in part in the description which follows and, in part, will be apparent from the description, or may be learned by practice of the invention.

Embodiments of the present invention disclose a method, computer program product, and system for reducing the recovery time of a primary server. The first computer receives a signal that a second computer is back online after being offline, wherein the second computer was offline because of a failure. The first computer takes a first snapshot of the storage, wherein the storage is a data hierarchy storage that comprises different storage drives, wherein data that has a higher access frequency is stored on a first drive and data that has a lower access frequency is stored on a second drive. The first computer retrieves a previously taken second snapshot of the storage from a snapshot storage unit and determines a snapshot difference between the first snapshot and the second snapshot. The first computer transmits the snapshot difference and the first snapshot to the second computer, and transmits the data stored on the first drive to the second computer. The first computer promotes the data stored on the second drive to be considered equivalent to data stored drive and transmits the promoted data stored on the second drive to the second computer at the same transmission rate as the data stored on the first drive.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 6 depicts abstraction model layers according to an embodiment of the present invention.

DETAILED DESCRIPTION

Figure 1:
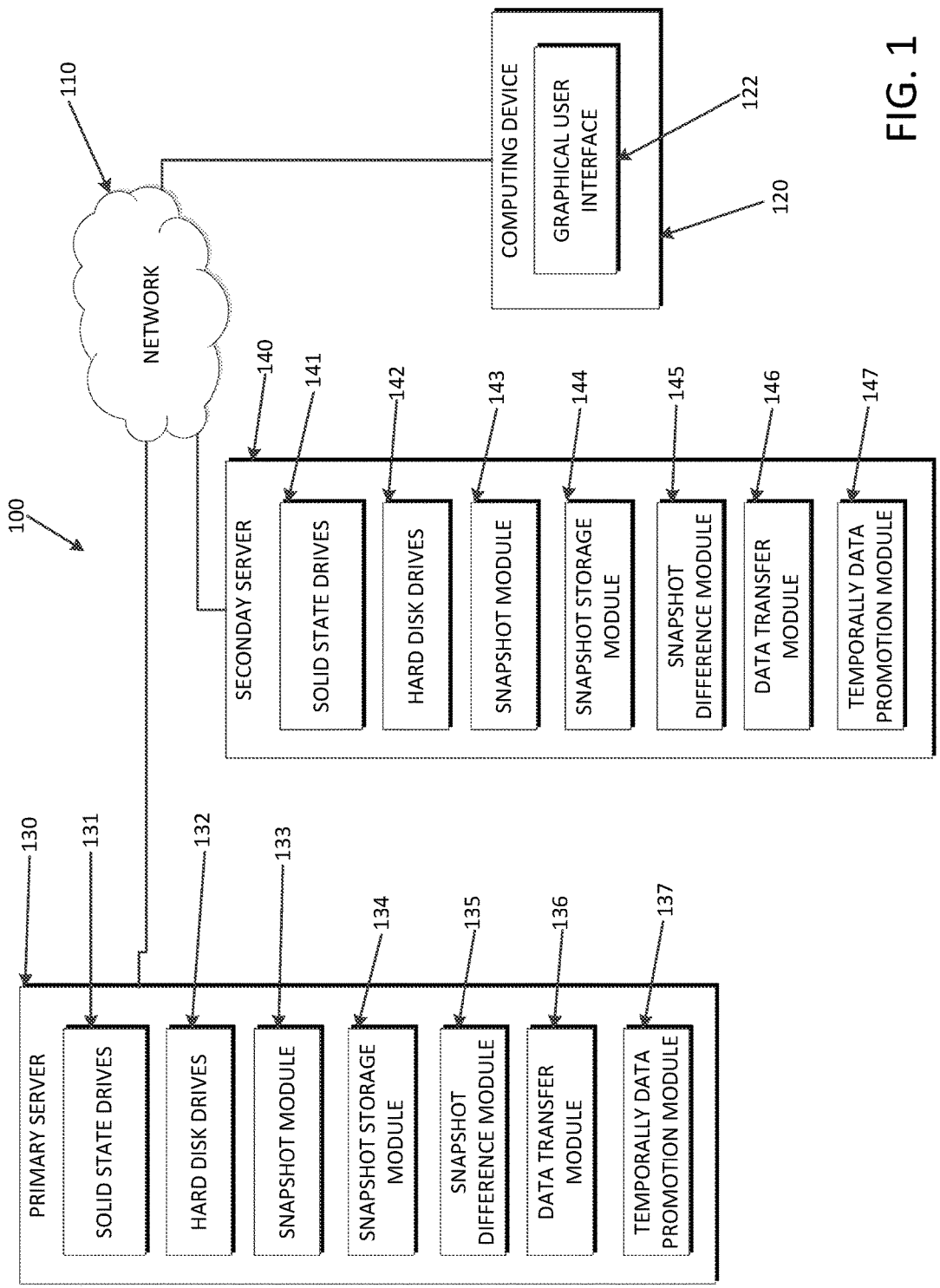
FIG. 1 is a functional block diagram illustrating a data processing environment, in accordance with an embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Reference will now be made in detail to the embodiments of the present invention, examples of which are illustrated in the accompanying drawings, wherein like reference numerals refer to like elements throughout. Embodiments of the invention are generally directed to a system for decreasing the recovery time of a primary server after a failure. A secondary server, acts as the primary while the primary server is offline, takes a snapshot of the multitier storage when the primary server comes back online. The secondary sever determines a snapshot difference between the new snapshot and a previously taken one. The secondary server transmits the data at the higher tier to the primary server. The secondary server temporally promotes the data stored at the lower tier to the high tier so that the data is transferred at the same rate as the data stored on the higher tier.

FIG. 1 is a functional block diagram illustrating a data processing environment 100, in accordance with an embodiment of the present invention. The data processing environment 100 includes a user computing device 120, a primary server 130, and a secondary server 140 that communicate via network 110.

Network 110 can be, for example, a local area network (LAN), a wide area network (WAN) such as the Internet, or a combination of the two, and can include wired, wireless, or fiber optic connections. In general, network 110 can be any combination of connections and protocols that will support communications between the user computing device 120, primary server 130, and secondary server 140 in accordance with one or more embodiments of the invention.

The user computing devices 120 represents a computing device that includes a user interface, for example, a graphical user interface 122. The graphical user interface 122 can be any type of application that is run on the primary server 130, for example, the application can be a web application, a graphical application, an editing application or any other type of application/program that requires access to the data stored on the primary server 130.

The user computing device 120 may be any type of computing devices that are capable of connecting to network 110, for example, a laptop computer, tablet computer, netbook computer, personal computer (PC), a desktop computer, a smart phone, or any programmable electronic device supporting the functionality required by one or more embodiments of the invention. The user computing device 120 may include internal and external hardware components, as described in further detail below with respect to FIG. 4. In other embodiments, the primary server 130 may operate in a cloud computing environment, as described in further detail below with respect to FIGS. 5 and 6.

The primary server 130 includes solid state drives 131, hard disk drives 132, a snapshot module 133, a snapshot storage module 134, a snapshot difference module 135, a data transfer module 136, and a temporally data promotion module 137. The primary server 130 is able to communicate with the secondary server 140 and the user computing device 120, via network 110. Primary server 130 may include internal and external hardware components, as depicted and described in further detail below with reference to FIG. 4. In other embodiments, computing device 120 may include internal and external hardware components, as depicted and described in further detail below with respect to FIG. 5, and operate in a cloud computing environment, as depicted in FIG. 6.

Multi-tiered storage is a storage method where data is stored on various types of storage devices primarily based on criteria of the access, frequency of use, security and data recovery requirements. For example, data that is frequently accessed by an application that is response time sensitive might be stored on solid state drives (SSDs) 131. Other data that is infrequently accessed and for which a higher response time is more tolerable might be stored on high capacity 7.2K RPM drives, for example, hard disk drives (HDDs) 132. The cost per gigabyte of storage is much higher for solid state drives 131 than it is for the hard disk drives 132. One challenge in effectively using multi-tiered storage is identifying the data that benefits from the higher cost/ higher performance storage tiers. Over the time, the optimal tier for a given piece of data may change. Thus the identification and movement of data to the appropriate tier is an ongoing process.

Since SSDs 131 are costlier than HDDs 132, this solution allows dynamic relocation of data across tiers based on the data usage by placing "hot" data with high access frequency and low response time on SSDs 131 while targeting HDDs 132 for "cooler" data that is accessed more sequentially and/or at lower rates.

Snapshot module 133 takes a snapshot of solid state drives 131 and the hard disk drives 132. Snapshot is a common industry term denoting the ability to record the state of a storage device or file system at any given moment and preserve that snapshot as a guide for restoring the storage device or file system in the event that it fails. The snapshot module 133 primarily creates a point-in-time copy of the data. Typically, snapshot copy is done instantly and made available for use by other applications such as data protection, data analysis and reporting, and data replication. The original copy of the data continues to be available to the applications without interruption, while the snapshot copy is used to perform other functions on the data. Snapshots enable better application availability, faster recovery, easier back up management of large volumes of data, reduces exposure to data loss, virtual elimination of backup windows, and lowers total cost of ownership.

In storage, replication of a dataset refers to the process of maintaining two or more identical copies of a dataset, across two or more sites, for example, the primary server 130 and the secondary server 140. In asynchronous replication context we can have one primary sever 130 and the backup secondary server 140. There are two basic modes of replication of data between the primary server 130 and the secondary server 140, the modes of replication are synchronous and asynchronous. Synchronous replication replicates the data from the primary server 130 to the backup secondary server 140 in sync at any point of time. Asynchronous replication, there is usually a time delay between the replicas of the data which is defined by the Recovery Point Objective (RPO)/Recovery Time Objective (RTO) parameters in replication configuration. RPO define how often consistent copies need to be taken and synced between the replication sites. RTO specifies how quickly changes made at the primary need to be made available at the secondary.

The snapshot module 133 can take the snapshots at the primary site according to the RPO configuration parameter and store the snapshots in the snapshot storage module 134. The snapshot storage module 134 is a data store the stores all of the previous taken snapshots. The snapshot difference module 135 compares the current snapshot with the most recent previously taken stored snapshot to determine the difference between the two snapshots. The data transfer module 136 transmits the snapshot and the difference between the two snapshots to the secondary server 140. The data transfer module 136 transfers the new data (the difference between the two snapshots), i.e. the hot data stored on the SSDs 131 and the cold data stored on the HDDs 132, to the SSDs 141 and the HDDs 142 located at the secondary server 140.

When the primary server 130 fails, the secondary server 140 is upgraded to a temporally primary (read-write) and has updates. Once the primary server 130 comes back online, the relationship needs to be reestablished. This requires replaying the new updates at the secondary server 140 back at the primary server 130.

The secondary server 140 includes a solid state drives 141, a hard disk drives 142, a snapshot module 143, a snapshot storage module 144, a snapshot difference module 145, a data transfer module 146, and a temporally data promotion module 147. The secondary server 140 is able to communicate with the primary server 130 and the user computing device 120, via network 110. Secondary server 140 may include internal and external hardware components, as depicted and described in further detail below with reference to FIG. 4. In other embodiments, computing device 120 may include internal and external hardware components, as depicted and described in further detail below with respect to FIG. 5, and operate in a cloud computing environment, as depicted in FIG. 6.

The solid state drives 141 and the hard disk drives 142 comprise the same storage system as described above with respect to the SSDs 131 and HDDs 132. When the secondary server 140 is acting as a temporally as the primary while the primary server 130 is offline, then the secondary server 140 receives any new data that would have been sent to the primary server 130. The secondary server 140 receives a signal that the primary server 130 is back online, then it starts the procedures to restoring and updating the primary server 130. The snapshot module 143 acts similarly as snapshot module 133 as explained above. The snapshot module 143 takes a snapshot of the SSDs 141 and HDDs 142. The snapshot difference module 145 retrieves most recent stored snapshot from the snapshot storage module 144 that it received from the primary server 130. The snapshot storage module 144 is a data store similar to the snapshot storage module 134 as described above. The snapshot difference module 145 determines the difference between the current snapshot and the retrieved snapshot. The data transfer module 146 transfers the current snapshot and the determined snapshot difference to the primary server 130.

The data transfer module 136 primary server 130 receives both the new snapshot and the snapshot difference from the data transfer module 146 of the secondary server. The snapshot difference module 135 retrieves the last complete snapshot (for example, the most recent snapshot not corrupted by the failure of the primary server 130) and determines the snapshot difference between the retrieved snapshot and the snapshot received from the secondary server 140. The snapshot difference module 135 compares the determined snapshot difference with the received snapshot difference from the secondary server 140. The snapshot difference module 135 determines if the differences are the same or different. When they are the same the data transfer module 136 transmits confirmation that the snapshot difference is accurate or when the difference are different then the data transfer module 136 transmits the determined snapshot difference to the secondary server 140.

The time required for primary server 130 to become active is directly dependent on the time required to restore the data on the primary server 130. In case of new data, the restore time depends on location of data (tier) on the secondary server 140. The data stored on SSDs 141 is transferred faster than the data stored on HDDs 142, thus the restoration time is dependent on slow transfer speed of the data stored on HDDs 142. Restoration will take less time if all required data is in fastest tier, i.e. SSDs 141, but if data is not on fastest tier then it will take more time for restoration. The data transfer module 146 transmits the hot data, fastest tier, i.e. the data stored on SSDs 141 to the primary server 130.

The temporally data promotion module 147 address the issue of transferring the cold data, i.e. the data store on the HDDs 142 to the primary server 130 in a timely fashion. The temporally data promotion module 147 increases the heats of the data blocks stored on HDDs 142 so they will be considered to be data stored on the SSDs 141. Increasing the heat of the block" means making it hot data block which will be moved to higher tier by easy tier kind of products. The temporally data promotion module 147 is using only one bit from reserved bits of this block to temporally increase the heat of the data block. The temporally data promotion module 147 temporally promotes the cold data stored on the HDDs 142 to be considered hot data that should be stored on the SSDs 141 so that data transfer module 146 will transfer the temporally promoted hot data at the same rate as the hot data stored on the SSDs 141.

The data transfer module 136 receives the hot data to be stored on SSDs 131 and the temporally hot data to be stored on the HDDs 132 from the secondary server. The temporally data promotion module 137 demotes the temporally hot data to be being cold data and the cold data is stored on HDDs 132. By temporally promoting the cold data to be considered hot data all for the restoration of the primary server 130 to happen faster than when the data is treated only as cold data, since the cold data has a slower transmission rate than hot data.

Figure 2:
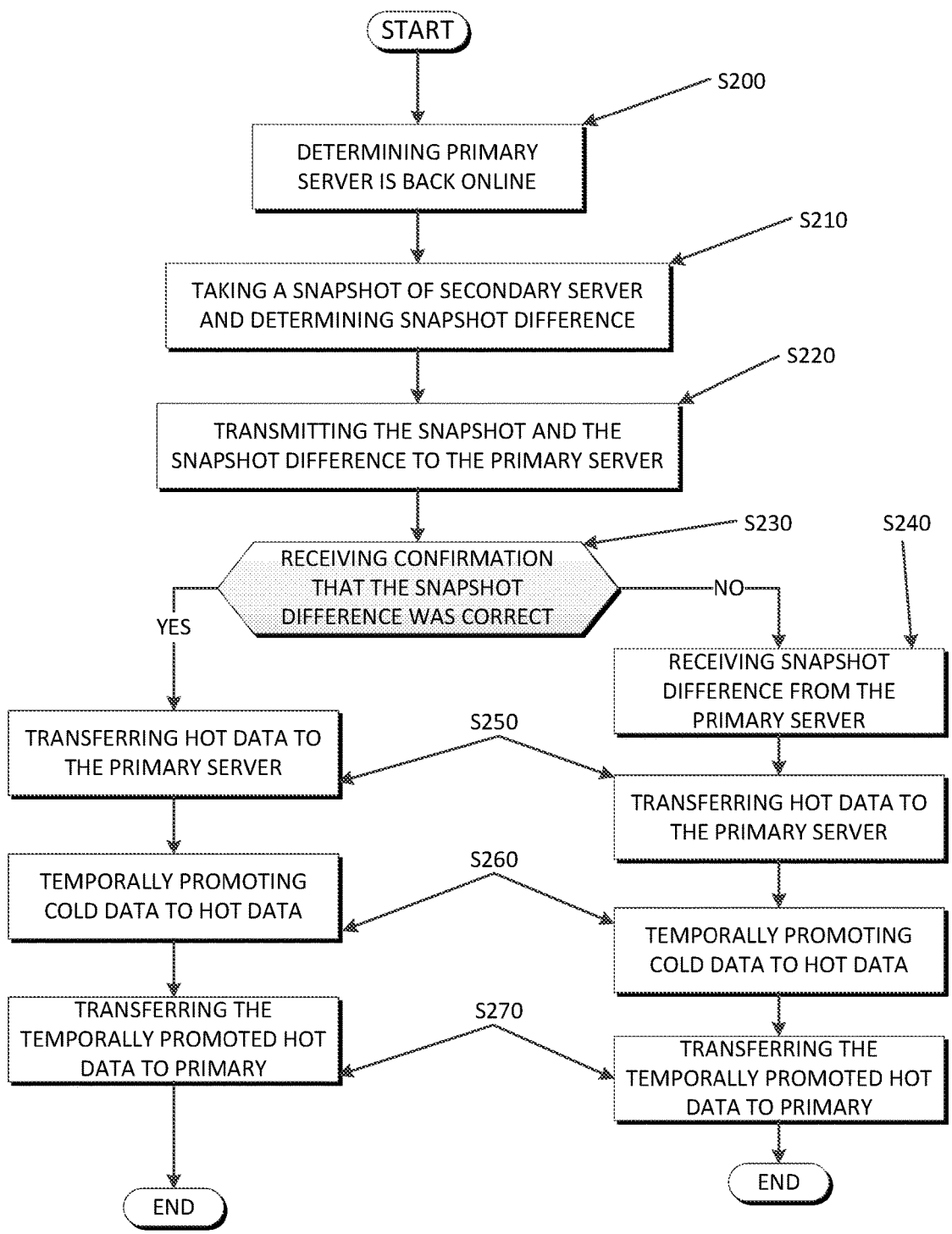
FIG. 2 is a flowchart depicting operational steps of reestablishing the primary server from the secondary server perspective within the data processing environment of FIG. 1, in accordance with an embodiment of the present invention.

FIG. 2 is a flowchart depicting operational steps of reestablishing the primary server from the secondary server perspective within the data processing environment of FIG. 1, in accordance with an embodiment of the present invention.

The secondary server 140 receives a signal or message that the primary server 130 is back online and ready for restoration (S200). The snapshot module 143 takes a snapshot of the SSDs 141 and HDDs 142 and retrieves the last snapshot received from the primary server that is stored in the snapshot storage module 144 (S210). The snapshot difference module 145 determines the snapshot difference between the current snapshot and the retrieved stored snapshot (S210). The data transfer module 146 transfers the snapshot and the snapshot difference to the data transfer module 136 on the primary server 130 (S220). The data transfer module 146 receives either a confirmation that the snapshot difference was correct or that it was not accurate (S230). When the snapshot difference was not accurate, then the data transfer module receives a new snapshot difference from the data transfer module 136 on the primary server 130 (S240). The next step are the same if the original snapshot difference was confirmed or if a new snapshot difference was received from the primary server 130. The data transfer module 146 transfers the hot data located on the SSDs 131 as indicated by the snapshot difference (S250). The temporally data promotion module 147 temporally promotes the cold data located on the HDDs 142 to be considered hot data as indicated by the snapshot difference (S260). The data transfer module 146 transfers the temporally hot data to the data transfer module 136 on primary server 130 (S270).

Figure 3:
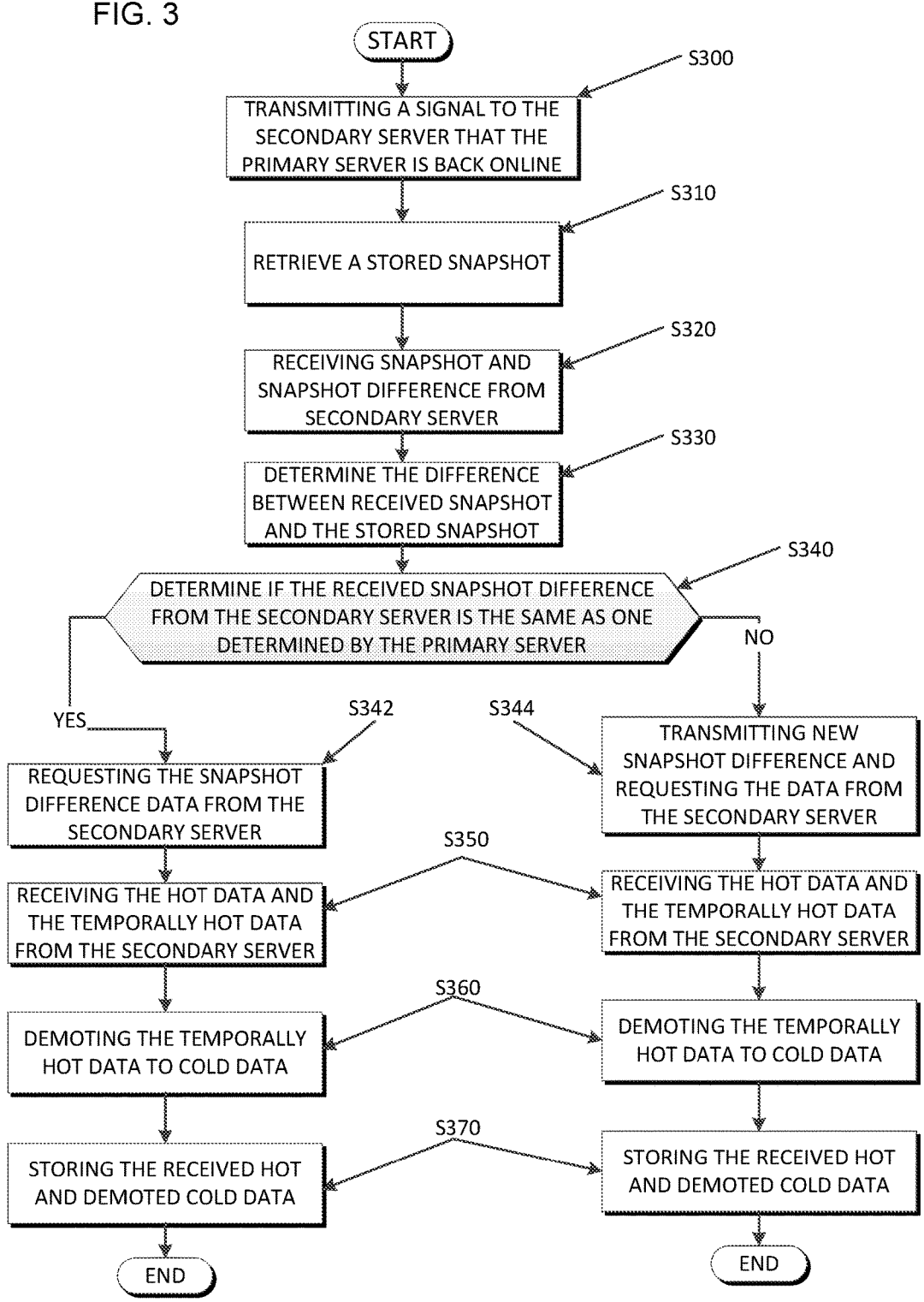
FIG. 3 is a flowchart depicting operational steps of reestablishing the primary server from the primary server perspective within the data processing environment of FIG. 1, in accordance with an embodiment of the present invention.

FIG. 3 is a flowchart depicting operational steps of reestablishing the primary server from the primary server perspective within the data processing environment of FIG. 1, in accordance with an embodiment of the present invention.

The primary server 130 comes back online after a failure and transmits a signal to the secondary server 140 to relay this information (S300). The snapshot difference module 135 retrieves the most recent complete and accurate stored snapshot from the snapshot storage module 134 (S310). The data transfer module 136 receives a snapshot and snapshot difference from the data transfer module 146 on the secondary server 140 (S320). The snapshot difference module 135 determines a snapshot difference between the retrieved snapshot and the snapshot received from the secondary server 140 (S330). The snapshot difference module 135 compares the determined snapshot difference to the snapshot difference received from the secondary server 140 to determine if they are the same (S340). When the snapshot difference are the same then the data transfer module 136 transmits a confirmation that the snapshot difference is accurate (S342). When the snapshot difference are determined different then the data transfer module 136 transmits the determine snapshot difference to the data transfer module 146 on the secondary server 140 (S344). The next steps are the same when the primary server 130 is receiving the data from the secondary server. The data transfer module 136 receives the hot data and the temporally hot data from the data transfer module 146 on the secondary server 140 (S350). The temporally data promotion module 137 demotes the temporally hot data to being cold data (S360). The data transfer module 136 stores the hot data on the SSDs 131 and the cold data on the HDDs 132 (S370).

Figure 4:
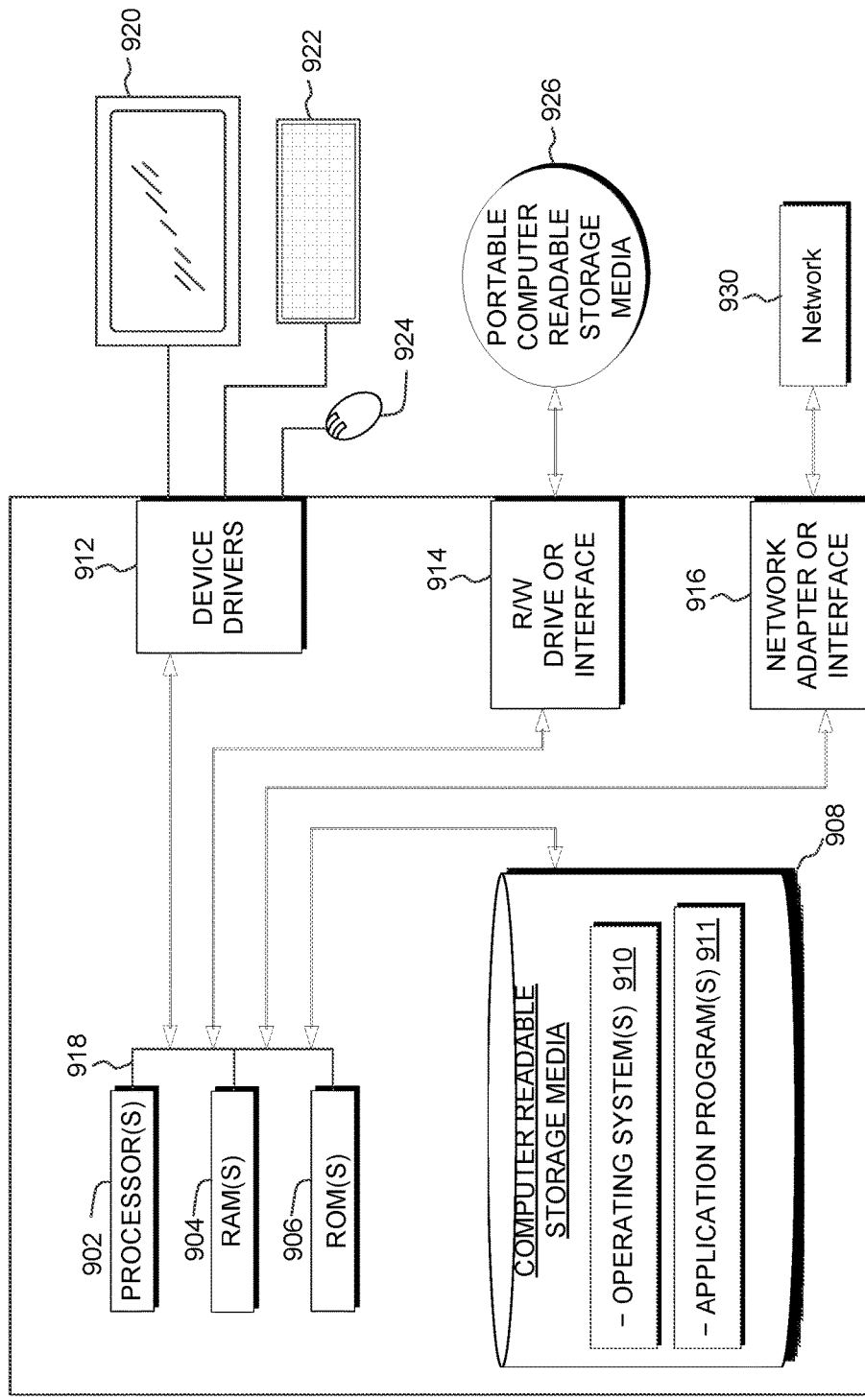
FIG. 4 is a block diagram of components of a computing device of the secure communication systems of FIG. 1, in accordance with embodiments of the present invention.

FIG. 4 depicts a block diagram of components of user computing device 120, the primary server 130, and the secondary server 140 of the data processing environment 100 of FIG. 1, in accordance with an embodiment of the present invention. It should be appreciated that FIG. 4 provides only an illustration of one implementation and does not imply any limitations with regard to the environments in which different embodiments may be implemented. Many modifications to the depicted environment may be made.

The user computing device 120, the primary server 130, and/or the secondary server 140 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. The network adapter 916 communicates with a network 930. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 911, for example, temporally data promotion modules 137 and 147 (FIG. 1), are stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

The user computing device 120, the primary server 130, and/or the secondary server 140 may also include a R/W drive or interface 914 to read from and write to one or more portable computer readable storage media 926. Application programs 911 on the user computing device 120, the primary server 130, and/or the secondary server 140 may be stored on one or more of the portable computer readable storage media 926, read via the respective R/W drive or interface 914 and loaded into the respective computer readable storage media 908.

The user computing device 120, the primary server 130, and/or the secondary server 140 may also include a network adapter or interface 916, such as a Transmission Control Protocol (TCP)/Internet Protocol (IP) adapter card or wireless communication adapter (such as a 4G wireless communication adapter using Orthogonal Frequency Division Multiple Access (OFDMA) technology). Application programs 911 on the user computing device 120, the primary server 130, and/or the secondary server 140 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

The user computing device 120, the primary server 130, and/or the secondary server 140 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
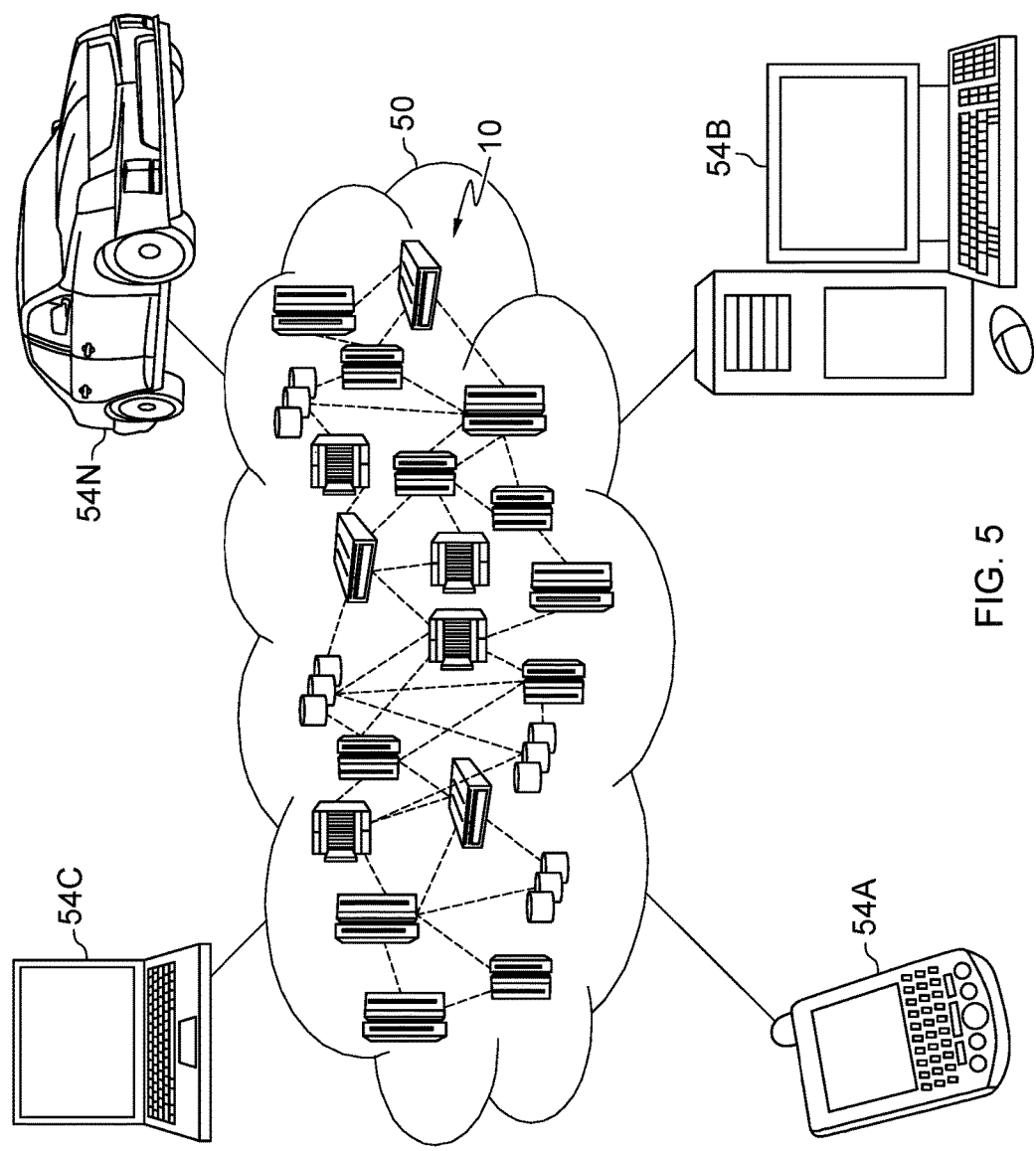
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a data processing environment 96.

Based on the foregoing, a computer system, method, and computer program product have been disclosed. However, numerous modifications and substitutions can be made without deviating from the scope of the present invention. Therefore, the present invention has been disclosed by way of example and not limitation.

While the invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A method for data recovery in a data processing environment, comprising:

receiving, by a secondary computer, a first snapshot of a primary storage system taken by a primary computer, wherein the storage system includes a data hierarchy storage system that comprises at least one solid state storage drive and at least one hard disk storage drive, wherein data that has a higher access frequency is stored on the at least one solid state drive and data that has a lower access frequency is stored on the at least one hard disk drive;

storing, by the secondary computer, the received first snapshot in a storage unit;

receiving, by the secondary computer, a notification that the primary computer is down because of failure;

taking, by the secondary computer, a second snapshot of a secondary storage system, wherein the storage system includes a data hierarchy storage system that comprises at least one solid state storage drive and at least one hard disk storage drive, wherein data that has a higher access frequency is stored on the at least one solid state drive and data that has a lower access frequency is stored on the at least one hard disk drive;

retrieving, by the secondary computer, the first snapshot from the storage unit;

determining, by the secondary computer, the differences between the second snapshot and the first snapshot, wherein the differences are data stored on the secondary computer while the primary computer was down to failure, wherein the data stored in the at least one solid state storage drive is considered to be high priority data and data stored in at least one hard disk storage drive is considered low priority data, wherein high priority data is transmitted at quicker rate than low priority data;

promoting, by the secondary computer, the data stored in at least one hard disk storage drive to a temporary status of high priority data;

transmitting, by the secondary computer, the high priority data and the low priority data with the temporary high priority status at the same rate.

* * * * *